(12) United States Patent
Giessen et al.

(10) Patent No.: US 9,735,536 B2
(45) Date of Patent: Aug. 15, 2017

(54) OPTICAL SYSTEM AND METHOD

(71) Applicant: Baden-Wuerttemberg Stiftung gGmbH, Stuttgart (DE)

(72) Inventors: Harald Giessen, Marnheim (DE); Tobias Steinle, Stuttgart (DE); Andy Steinmann, Korntal-Muenchingen (DE)

(73) Assignee: Baden-Wuerttemberg Stiftung gGmbH, Stuttgart (DE)

( * ) Notice: Subject to any disclaimer, the term of this patent is extended or adjusted under 35 U.S.C. 154(b) by 0 days.

(21) Appl. No.: 15/061,662

(22) Filed: Mar. 4, 2016

(65) Prior Publication Data

US 2016/0268764 A1 Sep. 15, 2016

(30) Foreign Application Priority Data

Mar. 6, 2015 (EP) ..................................... 15000665

(51) Int. Cl.
*H01S 3/108* (2006.01)
*H01S 3/094* (2006.01)
*G02F 1/139* (2006.01)

(52) U.S. Cl.
CPC ............ *H01S 3/1083* (2013.01); *G02F 1/139* (2013.01); *H01S 3/094076* (2013.01)

(58) Field of Classification Search
CPC ............................... H01S 3/1083; G02F 1/139
See application file for complete search history.

(56) References Cited

U.S. PATENT DOCUMENTS

| | | | | |
|---|---|---|---|---|
| 2003/0112835 | A1* | 6/2003 | Williams | ............... H01S 3/067 372/6 |
| 2009/0168148 | A1 | 7/2009 | Kondo et al. | |
| 2015/0288127 | A1* | 10/2015 | Hu | ....................... G02F 1/3534 359/260 |

FOREIGN PATENT DOCUMENTS

WO 2015/006494 A1 1/2015

OTHER PUBLICATIONS

Saar, Brian G. et al., "Intracavity wavelength modulation of an optical parametric oscillator for coherent Raman microscopy", Optics Express, vol. 17, No. 15, Jul. 20, 2009, 8 pages.

(Continued)

*Primary Examiner* — Dung Nguyen
(74) *Attorney, Agent, or Firm* — Brake Hughes Bellermann LLP

(57) ABSTRACT

Optical system and method for the provision of at least one high-frequency modulated light pulse having a pump light source for the provision of high-frequency pump light pulses; an optical resonator having a coupling element for coupling the pump light pulses into the resonator and a decoupling element for decoupling the at least one high-frequency modulated light pulse from the resonator and an optically non-linear frequency conversion medium arranged in the resonator for transforming the pump light pulses in each case into two conversion light pulses and one residual pump light pulse. The resonator comprises a feedback arm for at least one of the two conversion light pulses and/or the residual pump light pulse, in which an optically non-linear feedback medium is arranged for the optical modulation of the at least one conversion light pulse and/or the residual pump light pulse.

18 Claims, 3 Drawing Sheets

(56) References Cited

OTHER PUBLICATIONS

Dikmelik, Yamaç et al., "Plane-Wave Dynamics of Optical Parametric Oscillation with Simultaneous Sum-Frequency Generation", IEEE Journal of Quantum Electronics, vol. 35, No. 6, Jun. 1, 1999, 16 pages.
Extended European Search Report for European Application No. 15000665.8, mailed Sep. 18, 2015, 10 pages.

* cited by examiner

OPTICAL SYSTEM AND METHOD

The invention relates to an optical system and a method for the provision of at least one high-frequency modulated light pulse.

Mechanical choppers, electro-optic modulators (abbreviation: EOM), acousto-optic modulators (abbreviation: AOM) or direct current modulation of diodes can be used for modulating laser pulses, which are typically provided by mode-coupled oscillators. In so doing, mechanical methods, that is, e.g. a modulation using a mechanical chopper, only achieve a modulation frequency of several 10 kHz. Acousto-optic modulators and electro-optic modulators are limited to a maximum modulation range of approximately 50 MHz and additionally require costly power electronics to activate the modulation. This limit applies in particular to the modulation of pulsed lasers with a high average output greater than 10 mW and a short pulse duration smaller than 10 ps, for which the present invention can be used. Directly modulated diodes are unable to modulate pulses in the femtosecond range; instead, they are limited to the modulation of pulses with a maximum length of several 100 picoseconds or nanoseconds. For the directly modulated diodes, a modulation in the high-frequency range is also very challenging form a technical point of view. Furthermore, the known methods for the modulation are actively controlled, i.e., the modulation is performed by means of control electronics.

The object of the invention is to provide a modulation in the high-frequency range, specifically for short light pulses having a short pulse duration e.g. in the femtosecond range. In so doing, the object of the invention is in particular to enable a cost-efficient modulation of light pulses with ultra-high frequencies.

Said object is solved with the subjects of the independent claims. Preferred other embodiments are the subjects of the dependent claims.

A first aspect relates to an optical system for the provision of at least one high-frequency modulated light pulse having a pump light source for the provision of high-frequency pump light pulses. Furthermore, the optical system comprises an optical resonator, which comprises a coupling element for coupling the pump light pulses into the resonator and a decoupling element for decoupling the at least one high-frequency modulated light pulse from the resonator. An optically non-linear frequency conversion medium for transforming the pump light pulses in each case into two conversion light pulses and a residual pump light pulse is arranged in the resonator. In so doing, the resonator comprises a feedback arm for at least one of the two conversion light pulses and/or the residual pump light pulse. An optically non-linear feedback medium is arranged in the feedback arm for the optical modulation of the at least one conversion light pulse and/or the residual pump light pulse, for which the feedback arm is designed and envisaged.

The purpose of the optical system is to provide a high-frequency modulated light pulse. In the context of the present invention, high frequency means a frequency of at least 10 kHz, preferably at least 100 kHz. Particularly preferably, high-frequency frequencies relate to frequencies in the megahertz range. As a general rule, no upper limits have been specified for the frequencies; in particular, the invention can also be used for frequencies into the single-digit gigahertz range.

The light pulse provided by the optical system can in particular be modulated in the amplitude. This means that the optical system provides a sequence of light pulses having an identical central wavelength, which are modulated with regard to their amplitude.

The pump light source can be configured as a pulsed laser, which initially provides the high-frequency pump light pulses as unmodulated pump light pulses.

The pump light pulses are coupled into the optical resonator on the coupling element and transformed within the resonator by the frequency conversion medium. Said transformation takes place under interaction with the frequency conversion medium. Said interaction takes place as optically non-linear interaction, in which at least one output ratio of the pump light pulse is transformed. A further (e.g. residual) output ratio of the pump light pulse is not transformed in the frequency conversion medium, but instead passes through the frequency conversion medium without interaction, exiting it as residual pump light pulse with unchanged wavelength. The residual pump light pulse comprises a lower amplitude than the pump light pulse, because it lost some of its energy during the interaction with the frequency conversion medium. Said energy is transformed into the two conversion light pulses. In so doing, at least two conversion light pulses are generated, whose wavelength in each case differs from the wavelength of the pump light pulse. In so doing, the energy of the pump light pulse can be transformed in its entirety into the two conversion light pulses. Moreover, losses may occur, and/or a third or further conversion light pulse may be generated. However, the pump light pulse is preferably transformed into exactly two conversion light pulses in the frequency conversion medium, while an untransformed output ratio of the pump light pulse exits the frequency conversion medium in the form of a residual pump light impulse.

The residual pump light pulse comprises essentially the same wavelength as the pump light pulse. The two conversion light pulses have a different wavelength than the pump light pulse and hence also the residual pump light pulse. The two conversion light pulses can comprise the same wavelength or a wavelength that is different from one another.

The feedback arm of the resonator is designed and envisaged for at least one of the light pulses that exits the frequency conversion medium. For example, this can be a first of the two conversion light pulses, a second of the two conversion light pulses and/or the residual pump light pulse. The feedback arm can be designed either for the circulation of one of the three afore-mentioned light pulses, or for the circulation of two or all of the afore-mentioned light pulses. The feedback arm and the feedback medium are preferably designed and envisaged for exactly one of said three light pulses.

The interaction of said one light pulse of the three afore-mentioned light pulses with the optically non-linear feedback medium modulates the light pulse in its amplitude. In so doing, the magnitude of the modulation, that is, the magnitude of the interaction with the feedback medium is dependent on the intensity and thus the amplitude of the light pulse.

To simplify the illustration, the light pulse for the retention of which the feedback arm is designed and envisaged, is referred to as feedback light pulse in the context of this application. Thus, the feedback light pulse is in particular one of the following light pulses:
the first of the two conversion light pulses,
the second of the two conversion light pulses, or
the residual pump light pulse.

The amplitude of the feedback light pulse is modulated in the feedback arm in the feedback medium and supplied back into the part of the resonator in which the frequency conversion medium is arranged. More precisely, the phase of the feedback light pulses is first modulated in the feedback arm, bringing about a modulation of the peak amplitude. Self-phase modulation is achieved as a result. In so doing, the feedback medium can in particular be selected and/or tuned to the wavelength and/or the amplitude of the feedback light pulse.

The optical length of the feedback arm can be designed and envisaged such that a feedback light pulse coupled back from the feedback arm essentially passes through the frequency conversion medium together with the successional pump light pulse. For this purpose, the optical length of the resonator can in particular be adjustable such that the feedback pulse passes through the frequency conversion medium together with the first successional pump light pulse, or with the second successional pump light pulse, or with the third successional pump light pulse, etc.

The feedback light pulse comprises one of the light wavelengths into which the successional pump light pulse is "dispersed" in the frequency conversion medium. This is the reason why the optically non-linear transformation of the successional pump light pulse that passes through the frequency conversion medium together with the feedback light pulse is stronger than the transformation of a pump light pulse without feedback light pulse. Therefore, the frequency conversion in the frequency conversion medium into the two conversion light pulses and the residual pump light pulse takes place with different strengths of amplitudes, depending among other things on the amplitude of the feedback light pulse. As a result, all light pulses decoupled on the decoupling element are undergoing amplitude modulation.

The decoupling element can have a multi-part design and comprise a plurality of individual components. For one, the individual components of the decoupling element can be designed such that they recirculate the feedback light pulse (such as e.g. the signal pulse) at an adjustable output ratio into the feedback arm and thus only decouple it at an adjustable output ratio. Moreover, the individual components of the decoupling element can be designed such that they essentially completely decouple the remaining light pulses, such as e.g. the residual pump light pulse and the idler pulse in a targeted wavelength-sensitive fashion.

In other words, the modulation of the feedback light pulse is based on a dependency between the magnitude of the non-linear interaction with the feedback medium and the amplitude of the feedback light pulse. The amplitude of the feedback light pulse is in turn dependent on the magnitude of the non-linear interaction in the frequency conversion medium. The magnitude and/or characteristics of said two optically non-linear interactions can be different for individual circulations in the resonator. The magnitude and/or characteristics of the interactions can e.g. vary periodically by differing degrees, thus bringing about a periodic modulation.

The decoupled residual pump light pulse or one of the decoupled two conversion light pulses or two or three of the afore-mentioned light pulses can e.g. be used as the high-frequency modulated light pulse provided by the optical system. Individual or a plurality of the afore-mentioned decoupled light pulses can be provided as modulated pulse train. Preferably at least one of the conversion light pulses is used as feedback light pulse, rather than the residual pump light pulse. When using at least one of the conversion light pulses as feedback light pulse, it is possible to use particularly low-loss components as coupling element and/or as decoupling element. This is due e.g. to the fact that the conversion light pulses comprise a different wavelength than the residual pump light pulse, and can therefore be activated specifically by the coupling and decoupling element.

Thus, the optical system enables a purely passive modulation of high-frequency light pulses without expensive and/or complex power electronics and/or control electronics. The modulation can take place in a purely passive and in particular purely optical manner. This represents an advantage compared to the prior art with regard to the costs of the system, with regard to the operating costs, and with regard to the modulatable frequency range. The optical system enables a modulation of particularly high-frequency light pulses, comprising for example a pulse duration in the femtosecond range.

The optical system can in particular be designed as an optical device having a plurality of system components such as the pump light source and the optical resonator.

According to one embodiment, a non-linear phase shift of the at least one of the two conversion light pulses and/or the residual pump light pulse in the feedback medium is adjusted to an attractor of the optical system. Hence, in particular the non-linear phase shift of the feedback light pulse is adjusted to the attractor of the optical system. The observed modulation therefore takes place in an attractor of the dynamic optical system as a kind of "stable state" of the optical system. To adjust the system to an attractor, the non-linear phase shift of the feedback light pulse is adjusted precisely to one attractor. Depending on the amplitudes (and thus the pulse energies and pulse powers) of the individual pulses circulating in the resonator, an attractor can be adjusted, which results in a stable amplitude modulation. The non-linear phase shift in the feedback medium can be achieved for instance with an activation of the pulsed energy of the coupled pump light pulses and/or an activation of a decoupling coefficient of the decoupling element for one or all of the pulses circulating in the resonator. When the optical system is adjusted to one attractor, the modulation is particularly stable against output fluctuations or other interferences. Furthermore, the modulation in one attractor is particularly strong such that the high-frequency modulated light pulses are particularly suitable for a variety of applications.

According to one embodiment, the resonator is designed as optical parametric oscillator (abbreviation: OPO), which is designed to be synchronously pumped by the pump light pulses and which generates the two conversion light pulses as signal pulse and idler pulse. OPOs are well known from the prior art. The generation of a signal pulse and idler pulse in the non-linear frequency conversion medium in an OPO has likewise been disclosed before. However, the synchronously pumped OPO according to this embodiment comprises a feedback arm for the feedback light pulse with feedback medium. Moreover, the synchronously pumped OPO is set and/or adjusted such that at least one of the provided high-frequency light pulses undergoes an amplitude modulation. The provided high-frequency light pulse can in particular be the idler pulse, the signal pulse and/or the residual pump light pulse.

According to an upgrade of said embodiment, exactly one of the following three pulses is optically modulated in the feedback arm:
 the signal pulse,
 the idler pulse, or
 the residual pump light pulse.

In so doing, the optical modulation of one of the three above-mentioned pulses brings about a correlating modulation of the other two of the above-mentioned pulses. This means that either the signal pulse, the idler pulse or the residual pump light pulse is used as feedback light pulse in this connection. Preferably, the signal pulse or the idler pulse is used as feedback light pulse rather than the residual pump light pulse. The magnitude of the non-linear interaction with the feedback medium and thus the modulation of the feedback light pulse vary depending on the amplitude of the feedback light pulse. For example, when the amplitude of the feedback light pulse is small, the non-linear interaction with the feedback medium is weak, whereby the feedback light pulse is barely or not at all modulated. If the feedback light pulse is relatively strong and has a high amplitude, the interaction with the feedback medium is strong, whereby the previously high amplitude of the feedback light pulse is modulated to a very low amplitude of the feedback light pulse. It is recirculated and fed through the frequency conversion medium together with a successive pump light pulse. The magnitude of the non-linear frequency conversion in the frequency conversion medium is dependent on the amplitude size of the recirculated feedback light pulses.

The signal pulse, the idler pulse as well as the residual pump light pulse are modulated with each other in a correlated fashion by way of said association. Each of said three light pulses can be used individually and/or jointly with the other two as a high-frequency modulated light pulse and/or pulse train, after the light pulses have been decoupled from the resonator via the decoupling element. In so doing, the optical system not only provides one high-frequency modulated light pulse, but three high-frequency modulated light pulses, e.g. in the form of a pulse train, which are correlated with one another, that is, they have a close connection with one another.

According to one embodiment, the pump light source provides the high-frequency pump light pulses with a repetition rate of at least one megahertz. This corresponds to a typical high-frequency signal pulse. In so doing, the high-frequency modulated light pulses can comprise a modulation frequency up to half of the repetition frequency of the pump light pulses. This is the maximum achievable modulation frequency for an amplitude modulation of pulses.

In a special example, an ytterbium-doped potassium gadolinium tungstate crystal laser, abbreviation: Yb:KGW, can be used as pump light source. Said laser can provide e.g. pump light pulses with a wavelength of approx. 1040 nm, with a repetition rate of approx. 41 MHz, a pulse duration of approx. 500 femtoseconds and an average power output of approx. 2 to 3 watts. Said average power output of approx. 2 to 3 watts for pumping the optical system may be due to a split-off of a portion of the original pump light source power output of approx. 8 watts, which are originally provided by the pump light source. In a different embodiment, a Yb:KYW or Yb:CALGO (potassium yttrium tungstate or CaGdAlO4 laser) is used as pump light source.

According to one embodiment, the residual pump light pulse and/or at least one of the two conversion light pulses is decoupled from the resonator as high-frequency modulated light pulse. This can in particular be the feedback light pulse. However, one of the other two light pulses can be used as the modulated high-frequency light pulse in the same way. As the three mentioned light pulses correlate with one another, each of the three light pulses can be used as modulated light pulse.

According to one embodiment, the pump light source initially provides high-frequency output light pulses, which are split by the beam splitter into the high-frequency pump light pulses to be coupled into the resonator on the one hand and into high-frequency reference light pulses on the other hand. In so doing, the optical system not only provides the modulated light pulses, but also high-frequency reference light pulses. These correlate with the modulated light pulses. The reference light pulses themselves may be unmodulated, which is why they are particularly suitable as reference to the modulated light pulses for a variety of applications. The beam splitter can in particular be designed as controllable beam splitter, such that the output ratio of the pump light pulses fed into the optical resonator is controllable. Thus, the energy and output present in the resonator can be controlled by the control of the beam splitter, in particular a non-linear phase shift in the feedback arm and/or in the frequency conversion medium that is dependent on said energy and output.

According to an upgrade of said embodiment, the optical system is designed and envisaged to provide the high-frequency reference light pulses in such a way that they correlate with the high-frequency modulated light pulses. For this purpose, the system can comprise for example means for setting an optical path length of the reference light pulses and/or the modulated light pulses, with which the pulses can be chronologically synchronized.

In an upgrade of said embodiment, the high-frequency reference light pulses and the high-frequency modulated light pulses are designed and envisioned as Stokes pulses and pumped pulses in a Raman microscope. In this connection, the unmodulated reference light pulses can be used for example as Stokes pulses, and one of the two conversion light pulses can be used as pumped pulse in the form of a modulated light pulse. In this connection, the frequency conversion medium can be selected and/or designed such that a wavelength of one of the two conversion light pulses is generated, which is suitable for Raman microscopy. Said wavelength can be modified by a corresponding interaction e.g. after the modulation in the optical system, for example with a frequency duplicator such as e.g. a SHG crystal, etc. Thus, the optical system can be designed as part of a stimulated Raman microscope, for which preferably modulated light pulses together with unmodulated reference light pulses are used in order to obtain a well-differentiated Raman spectrum as microscopic result.

According to one embodiment, the optical system comprises an output adjustment device for adjusting the output of the pump light pulses that are coupled into the resonator. As both the interaction with the frequency conversion medium as well as the interaction with the feedback medium are dependent on the amplitude of the pulses present in the resonator, the output adjustment device provides the possibility to set and/or adjust the modulation in the optical system, in particular to an attractor of the optical system. The output adjustment device can be designed for example as an output control of the pump light source. The pump light source can be designed for example as a pulsed laser, whose output is adjustable. Alternatively or in addition, a beam splitter can be provided, which splits off a defined output portion from the originally emitted output light pulses and provides them as pump light pulses. Alternatively or in addition, it is also possible to use an optical reducer.

According to one embodiment, the decoupling coefficient of the decoupling element is designed to be adjustable. The decoupling coefficient can be designed both for a defined pulse present in the resonator, as well as for two, three or all pulses present in the resonator, that is, in particular the two conversion light pulses and the residual pump light pulse. The decoupling element can be designed and envisioned such that the residual pump light pulse and one of the two conversion light pulses are essentially completely decoupled, while the other of the two conversion light pulses is deflected at an adjustable ratio into the feedback arm as feedback light pulse. Thus, the decoupling coefficient can in particular be designed to be adjustable for the output of the feedback light pulse to a deflection coefficient between 90% and 100% and an associated decoupling coefficient between 10% and 0%.

Aside from the control of pump light pulse power, the control of the decoupling coefficient represents an additional or optional possibility to adjust the power that is present in the optical resonator. Different non-linear phase shifts are generated in the two optical non-linear media, depending on the amount of feedback light pulse power that is deflected into the feedback arm. Thus, the optical system can be adjusted to an attractor by controlling and/or adjusting the power in the resonator.

The decoupling coefficient of the decoupling element can in particular be achieved with the control of the polarization of one, a plurality or all of the pulses present in the resonator. In this connection, the decoupling coefficient can be adjustable in the resonator with the use of at least one polarizing beam splitter (abbreviated: PBS) combined with corresponding $\lambda/4$ and/or $\lambda/2$ plates, etc.

According to one embodiment, all reflections and non-linear interactions on the inside of the optical resonator are polarization conserving. This simplifies a control of the decoupling coefficient for all light pulses present in the resonator, e.g. by means of a PBS as component of the decoupling element.

According to one embodiment, the decoupling element is designed and arranged such that the residual pump light pulse and a first of the two conversion light pulses is completely decoupled, while the second of the two conversion light pulses is at least partly deflected into the feedback arm. As described, said second of the conversion light pulses can be used as feedback light pulse.

According to one embodiment, the feedback arm is designed as a separate feedback arm, which is spatially separated from a resonator arm of the resonator, in which the frequency conversion medium is arranged. In said embodiment, the feedback light pulse can be modulated in a particularly accurate fashion and independently of the feedback medium. The spatial separation additionally enables a particularly accurate adjustment of the optical length of the feedback arm, which can be matched to the repetition rate of the pump light pulses as well as their pulse duration.

According to one embodiment, the high-frequency light pulses provided by the optical system are modulated exclusively in an optical fashion. In so doing, the system can be designed entirely without any further costly power electronics. In particular, the system is capable of providing the modulation without acousto-optic converter and without electro-optic converter. This enables the implementation of a cost-efficient system for modulation in the high-frequency range. Hence, the modulation is passively and/or automatically synchronized to the repetition rate.

The feedback medium and the frequency conversion medium can be designed as separate non-linear media, which are arranged e.g. in separate arms of the resonator.

In one embodiment, the frequency conversion medium is at the same time designed as feedback medium. In said embodiment, the feedback arm can coincide with the resonator arm, in which the frequency conversion medium is arranged. In so doing, the resonator can essentially have a linear design. The feedback light pulse circulates in the linear resonator arm, into which the pump light pulses are also coupled, and undergoes an interaction while passing through the frequency conversion medium, which results in the desired modulation.

In this connection, the feedback light pulse can carry out a plurality of circulations, e.g. between 2 and 50 circulations in the resonator, before it coincides again with one of the successional pump light pulses. Thus, the use of a single non-linear medium is sufficient in this case to realize the modulated high-frequency light pulses.

A second aspect relates to a method for the provision of at least one high-frequency modulated light pulse. In so doing, high-frequency pump light pulses are provided, which are coupled into an optical resonator. In the resonator, the pump light pulses are transformed in an optically non-linear fashion into two conversion light pulses and one residual pump light pulse each. The at least one high-frequency modulated light pulse is decoupled from the resonator. In so doing, at least one of the two conversion light pulses and/or the residual pump light pulse is optically modulated in a feedback arm of the resonator by means of an optically non-linear feedback medium.

The method can in particular be carried out with an optical system according to the first aspect. Thus, the description of the optical system likewise relates to the method according to the second aspect and vice versa.

A third aspect concerns the use of the optical system according to the first aspect for the conduct of the method according to the second aspect.

The invention is explained in more detail below based on exemplary embodiments shown in the figures. Individual characteristics illustrated in the figures may be implemented in other embodiments. In the figures:

FIG. 2a shows a diagram of a high-frequency pump light pulse for an optical system according to an exemplary embodiment together with a plurality of high-frequency light pulses modulated by the optical system in the form of pulse trains;

FIG. 2b shows a diagram of the Fourier transforms pertaining to the pulse trains in the frequency domain illustrated in FIG. 2a;

Figure 1:
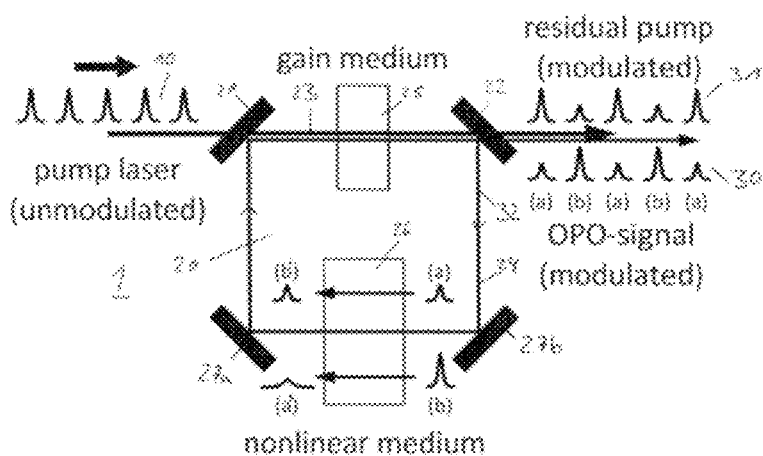
FIG. 1 shows a schematic illustration of an exemplary embodiment of an optical system for the provision of a high-frequency modulated light pulse.

FIG. 1 contains a schematic representation of an optical system 1 for the provision of high-frequency modulated light pulses. Pump light pulses 10 are provided by a point light source not illustrated in FIG. 1, which can be designed e.g. as a pulsed laser. The pump light pulses 10 are not modulated and for this reason (as illustrated in FIG. 1), their amplitude is essentially identical.

The pump light pulses 10 are coupled into an optical resonator 20 of the optical system 1, specifically by way of a coupling element 21. The coupling element 21 can comprise for example a polarizing beam splitter and/or a semi-transparent mirror. The coupling element 21 can in particular be designed as a dichroic mirror having a transmissive design for the pump light pulses 10 and a reflective design for a feedback light pulse 32 (cp. explanations below).

After passing through the coupling element 21, the pump light pulses 10 then transverse a first resonator arm 23 of the resonator 20. A frequency conversion medium 25 is arranged in the first resonator arm 23. The frequency conversion medium 25 is designed as an optically non-linear medium, such as it is commonly used in optical parametric oscillators (abbreviation: OPOs). In this connection, the frequency conversion can be achieved for example via difference frequency generation or via four-wave mixing. A first portion of the pump light pulses 10 is transformed into at least or exactly two conversion light pulses in the frequency conversion medium 25, for example into a signal pulse and an idler pulse. A second portion of the pump light pulses 10 passes through the frequency conversion medium 25 without non-linear interaction and exits the frequency conversion medium 25 as residual pump light pulse 31.

After the interaction with the frequency conversion medium 25, the three pulses (that is, the two conversion light pulses and the residual pump light pulse) continue to propagate in the first resonator arm 23 in the direction toward a decoupling element 22. The first resonator arm 23 can extend from the coupling element 21 past the frequency conversion medium 25 to the decoupling element 22. The first resonator arm 23 can have a linear design. A share of the pulses present on the inside of the resonator 20 can be decoupled on the decoupling element 22.

In the embodiment shown in FIG. 1, the residual pump light pulse 31 is essentially completely decoupled on the decoupling element 22, in the same manner as one of the two conversion light pulses, for example the idler pulse, is essentially completely decoupled. A share of the other of the two conversion light pulses, that is, e.g. the signal pulse, is in part not decoupled on the decoupling element 22, but deflected into a feedback arm 24 of the resonator 20. The decoupling element 22 can have an adjustable and/or variable design, meaning that the intensity of both the portion of the feedback light pulse 32 to be decoupled as well as deflected is adjustable and/or variable. Alternatively, the decoupling element 22 can also be designed as a fixed component, if the fixed value of the decoupling and deflection is selected analogously. The decoupling coefficient of the decoupling element 22 can have different values for the pulse trains circulating in the resonator 20.

The optical resonator 20 is essentially designed in the shape of a rectangle, whereby a deflection mirror is arranged on each of the rectangle's four corners. One of said deflection mirrors is designed as the coupling element 21, while another of the deflection mirrors is designed as the decoupling element 22. The first resonator arm 23 is designed as one of the sides of the rectangle of the resonator 20. The other three sides of the rectangle of the resonator 20 form the feedback arm 24.

In general, the feedback arm 24 extends from the decoupling element 22 back to the first resonator arm 23 via a suitable deflector, e.g. back to the coupling element 21.

In so doing, a first deflection mirror 27a and a second deflection mirror 27b are envisioned in the exemplary embodiment illustrated in FIG. 1, in order to guide the pulse coupled into the feedback arm 24 from the decoupling element along the feedback arm 24 toward the coupling element 21.

The pulse deflected at the decoupling element 22 in the feedback arm, that is, e.g. one of the two conversion light pulses such as the signal pulse, is coupled from the decoupling element into the feedback arm 24 as feedback light pulse 32.

In general, the feedback light pulse 32 consists of a portion of light pulses, which are deflected (e.g. by the decoupling element 22) from the first resonator arm 23 into the feedback arm 24.

A feedback medium 26 is arranged in the feedback arm 24 as an optically non-linear medium. In the embodiment shown in the figures, the feedback medium is arranged between the first deflection mirror 27a and the second deflection mirror 27b. However, the feedback medium 26 could also be arranged at a different position of the feedback arm 24.

The feedback light pulse 32 interacts with the feedback medium 26 in an optically non-linear fashion. The intensity of the interaction is dependent on the amplitude of the feedback light pulse 32. In the exemplary embodiment shown in FIG. 1, the feedback light pulse 32 passes through the feedback medium 26 from the first deflection mirror 27a in the direction toward the second deflection mirror 27b.

Exemplary Modulation Adjustment of the Optical System

A schematic representation of a possible modulation is shown in FIG. 1, to which the optical system 1 is adjusted. In a schematic representation of a pulse shape on the right of the feedback medium 26, the feedback light pulse 32 has a medium amplitude, labelled as pulse shape (a) in FIG. 1. When a feedback light pulse having such a medium amplitude (a) passes through the feedback medium 26, it undergoes almost no change and exits the feedback medium as feedback light pulse 32 with the pulse shape shown as (b'). Said pulse shape (b') is shown on the left of the feedback medium 26, and likewise has a medium amplitude and virtually does not differ from the previous amplitude height shown as pulse shape (a) on the right of the feedback medium 26. In the case where the feedback light pulse 32 deflected into the feedback arm 24 has a medium amplitude (a), a feedback light pulse 32 having a medium amplitude (b') will likewise be coupled back into the first resonator arm 23 on the coupling element 21.

The optical system 1 is synchronously pumped. This means that the feedback light pulse 32, which is coupled back, is coupled into the first resonator arm 23 on the coupling element 21 essentially simultaneously with a successive pump light pulse 10. In so doing, the feedback light pulse 32 having the medium amplitude (b') amplifies the pump light pulse 10 and jointly passes through the frequency conversion medium 25 with it.

Overall, the output and intensity of the pulse train consisting of the feedback light pulse 32 having a medium amplitude (b') and the successive pump light pulse 10 is greater than the one of a pump light pulse 10 alone. As a result, the non-linear interaction is stronger for the amplified pulse train in the frequency conversion medium 25 than for a pump light pulse alone. As well, a greater output ratio of the pump light pulse 10 is transformed in this connection into the two conversion light pulses, that is, e.g. the signal pulse and the idler pulse. In this case, which is illustrated schematically as pulse shape (b) in FIG. 1, the residual pump light pulse 31 exits the resonator 20 with a low amplitude, while a feedback light pulse 32 with a high amplitude (b) is coupled back into the feedback arm 24. This is illustrated schematically on the right of the feedback medium 26, as pulse shape (b) having a high amplitude.

As said feedback light pulse with the pulse shape (b) has a higher energy than the feedback light pulse with the medium-sized pulse shape (a), the non-linear optical interaction with the feedback medium 26 is stronger in this case. The large feedback light pulse with the pulse shape (b) is thus transformed into a broadened small feedback light pulse having a pulse shape (a'). In this case, a feedback light pulse having a low amplitude (a') is thus coupled back into the first resonator arm 23 and sent through the frequency conversion medium 25 jointly with a successive pump light pulse 10 as pulse train.

The pulse train consisting of the feedback light pulse 32 having a low amplitude (a') and the successive pump light pulse 10 has a smaller output and intensity than a pump light pulse 10 combined with a feedback light pulse 32 having a medium amplitude (b'). For this reason, the frequency conversion that takes place in the frequency conversion medium 25 is less pronounced in this case. In so doing, a residual pump light pulse having a relatively high amplitude is generated, together with two conversion light pulses having for example a medium amplitude (b).

The corresponding light pulses decoupled on the decoupling element 22 are illustrated schematically as pulse shapes (a) and (b) in FIG. 1 next to the decoupling element 22. Any time the residual pump light pulse 31 has a high amplitude, a modulated light pulse 30 has a low amplitude and vice versa. One of the two conversion light pulses can e.g. be used as modulated light pulse 30, e.g. the light pulse that is also used as feedback light pulse (in the example, this would be signal pulse). The other conversion light pulse can either be discarded or also be decoupled as a modulated light pulse.

In this connection, the terms "large" and "small" refer to the peak amplitude of the feedback light pulse, and not necessarily to the total pulse energy. The feedback medium keeps the pulse energy constant for the most part, and changes the pulse shape and the peak amplitude of the feedback light pulse. Said effect also affects the pulse energy of the newly generated and hence the next decoupled and returned light pulse via the frequency conversion medium or the amplitude medium, respectively. Insofar, the change of the pulse shape and peak amplitude in the feedback medium transforms the feedback light pulse into a weaker or "modulated" coupled back feedback light pulse.

The modulation adjustment of the optical system 1 is dependent on the power of the pulses circulating in the resonator. Alternatively to the modulation adjustment of the optical system 1 with the resulting pulse shapes (a) and (b) illustrated as an example in FIG. 1, the system 1 can also be adjusted to a different modulation.

The system 1 provides a purely optical modulation of a mode-coupled pulse train. The system 1 can be designed as optical parametric oscillator having a non-linear feedback. The shown OPO with non-linear feedback enables the amplitude modulation of high-frequency light pulses.

The frequency conversion medium 25 can be designed e.g. as a strong non-linear medium with second-order non-vanishing susceptibility, as periodically poled lithium niobate (PPLN) or tantalate (PPLT) in congruent (PPcLN, PPcLT) or stoichiometric form (PPsLN, PPsLT), as orientation-patterned gallium arsenide (OP-GaAs), as bulk crystal and/or as waveguide. The frequency conversion medium 25 can also be implemented as a FWM (four-wave mixing) material, e.g. in a tapered fiber or a photonic crystal fiber (PCF). The frequency conversion medium 25 can at the same time also take over the function of the non-linear feedback medium 26, if the geometry of the resonator 20 is designed analogously.

The feedback medium 26 can be designed as non-linear medium with e.g. second-order vanishing susceptibility. The third-order susceptibility, which is non-vanishing in all media, is relevant for the effect of self-phase modulation. Thus, the feedback medium 26 can be designed as a type of optical fiber, waveguide or non-linear crystal. In so doing, almost all known materials can be used for the manufacture of said elements. In a special exemplary embodiment, the feedback medium 26 can be designed as a SMF-28 (telecom optical fiber). In one embodiment, the non-linear feedback medium 26 can be identical to the non-linear frequency conversion medium 25.

The optical system 1 enables the modulation of a previously unmodulated signal pulse, in particular a laser signal pulse. In so doing, the system 1 concerns for example the modulation of pulse trains of an ultra-short pulsed laser with pulse durations in the femtosecond or picosecond range.

The optical system 1 makes it possible to apply a maximum modulation frequency, which corresponds to half the repetition rate, onto a pulse train of ultra-short pulses. In this fashion, pulse trains with several 10 MHz can be modulated for procedures such as for example pump test measurements as well as for microscopic procedures such as the stimulated Raman microscopy or the CARS (coherent anti-Stokes Raman scattering) microscopy. Said frequency range is intrinsically extremely low noise, because the noise is proportional to $1/f$. Therefore, the optical system 1 provides modulated pulse trains with excellent signal-to-noise ratios.

The feedback arm 24 can be designed with an adjustable optical length. This way, the optical path length in the feedback arm 24 can be adjusted precisely to the distance between the pump light pulses 10. The feedback medium 26 serves a modulating element, which modulates the feedback light pulse in a passive and purely optical fashion.

In order to ideally adjust the involved pulse energies, that is, e.g. to an attractor of the optical system 1, a decoupling coefficient of the decoupling element 22 can be adjustable. The non-linear phase shift of the feedback light pulse in the resonator 20 and hence the intensity and the kind of the non-linear interactions in the two optically non-linear media (feedback medium 26 and frequency conversion medium 25) can be adjusted with said adjustment option. By adjusting the pulse powers present in the resonator, the optical effects in the resonator can be adjusted precisely to a desired modulation setting, that is, to a predeterminable modulation of the generated modulated light pulses 30.

Thus, the amplitude modulation in the optical system 1 is achieved with a passive element exclusively on the basis of optical effects in a self-regulating, back-coupled system.

In so doing, individual components of the optical system 10 can be tuned exactly to one another, such as e.g. the selection of the frequency conversion medium 25, a delay in the feedback arm 24, a filtration of individual wavelengths and the selection of the non-linear feedback medium 26. Furthermore, either the decoupling coefficient at the decoupling element is variable and/or adjustable, or the strength of the non-linear interaction in the feedback arm 24 and/or the output of the pump light pulses 10 coupled into the resonator 20.

The resonator 20 of the optical system 1 illustrated in FIG. 1 is designed as a single passage amplifier, in which the pump light pulses 10 only pass through the frequency conversion medium 25 a single time (as amplifier medium). In alternative embodiments, the resonator 20 can also be designed as multi-passage amplifier, in which the pump light pulses are not decoupled at the decoupling element at a rate of essentially 100%, but are in large part coupled back into the first resonator arm and pass through it a plurality of times. Said type of multi-passage amplifier would also comprise a separate feedback arm, in which the feedback light pulse interacts with the feedback medium separately from the pump light pulses.

The resonator 20 of the optical system 1 can comprise other elements not illustrated in the figures, such as e.g. a spectral filter (e.g. after the feedback medium 26) and/or dispersive elements (such as a prismatic segment) for dispersion compensation or pulse extension.

Figures 2A, 2B:
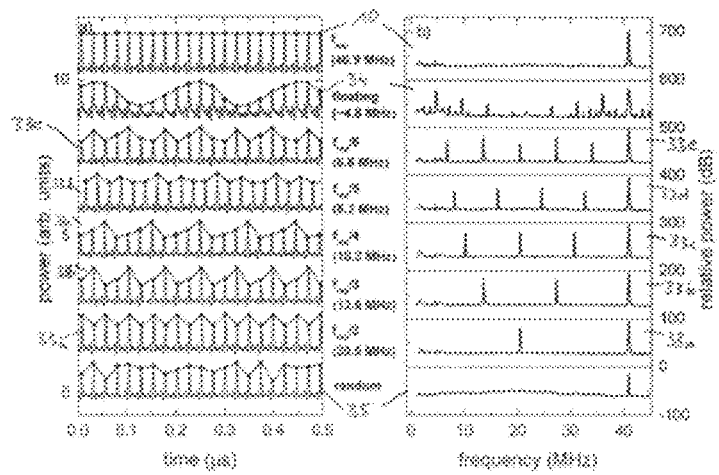

FIGS. 2a and 2b show diagrams of different pulse trains in the optical system 1. In so doing, FIG. 2a shows a diagram of the pulse trains in the time domain and FIG. 2b a diagram of the Fourier transform of the pulse trains in the frequency domain.

The unmodulated pump light pulse 10 is shown at the top in FIG. 2a, while modulated pulse trains 33a to 33e decoupled from the optical system 1 as well as a continuously modulated pulse train 34 and a randomly modulated pulse train 35 are shown underneath.

FIG. 2b shows the same pulse trains (that is, the pump light pulse 10, the modulated pulse trains 33a to 33e, the continuously modulated pulse train 34 and the randomly modulated pulse train 35) after a Fourier transformation in the frequency domain.

In the exemplary embodiment illustrated in the FIGS. 2a and 2b, the pump light pulses are provided with a repetition frequency of approx. 40.9 MHz, that is, for example with the Yb:KGW laser already mentioned above serving as pump light source. The pump light pulse 10 comprises exactly one frequency, which is clearly and visibly arranged at 40.9 MHz in the Fourier representation depicted in FIG. 2b.

The pulse trains 33a to 33e are different pulse trains decoupled from the optical system 1, which are composed of the decoupled modulated light pulses, e.g. the residual pump light pulse and the two conversion light pulses. The modulation of the generated pulse trains is strong, achieved with an integer fraction of the repetition rate of the pump light pulses 10.

As a result, different subharmonic components of the repetition rate can be generated as stable states, that is, as attractors, in the optical system.

For the first pulse train 33a, the modulation is generated with half the repetition rate of the pump light pulses 10, and for this reason, a second frequency occurs in the frequency domain at approx. 20.45 MHz aside from the value at approx. 40.9 MHz. The associated first light pulse 33a is clearly depicted with its modulation in FIG. 2a. Said modulation adjustment of the first light pulse 33a corresponds to the modulation adjustment having the schematic pulse shapes (a), (b) depicted schematically in FIG. 1. The modulation adjustment to the first light pulse 33a occurs exactly at the time when the output of the pulse trains in the optical system 1 is adjusted to a specific attractor.

A modulation adjustment to a different attractor can result e.g. in a modulation with one third of the repetition rate, which is depicted as second light pulse 33b in the FIGS. 2a and 2b. The third light pulse or pulse train 33c, respectively, is modulated with a frequency of 10.22 MHz corresponding to one fourth of the repetition rate of the pump light pulses, etc.

Each of the modulated pulse trains 33a to 33e shown in the FIGS. 2a and 2b is provided exactly at the time when the optical system 1 is adjusted to a specific attractor.

If the system is not adjusted to an attractor, this can result e.g. in the continuously modulated pulse train 34 or the randomly modulated pulse train 35, whose intensities can vary randomly. With the continuously modulated pulse train 34, the modulation is not fixed to the repetition rate, but it is close to a non-integral fraction of said rate.

The high-frequency modulated light pulse provided by the optical system 1 refers to a light pulse whose amplitude is modulated regularly, which can e.g. be modulated with an integer fraction of the repetition rate of the pump light pulses. In particular, a modulated pulse train can be provided as the high-frequency modulated light pulse, which (depending on the repetition rate of the pump light pulses) is modulated in the same way as one of the modulated pulse trains 33a to 33e.

Figure 4:
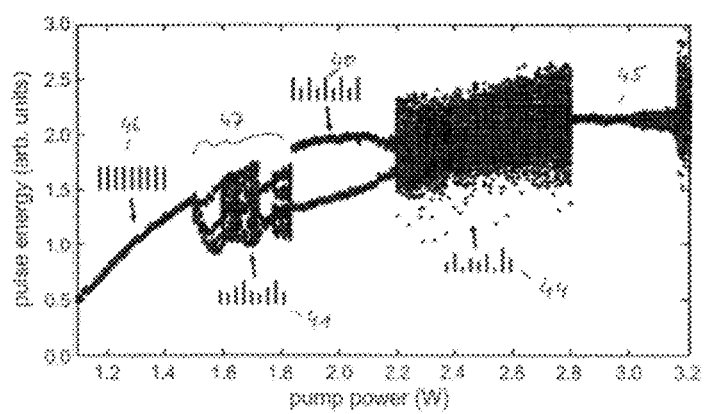
FIG. 4 shows a histogram of bifurcations of pulse trains of an optical system as a function of the pump power of the optical system.

This is illustrated in more detail in FIG. 4. FIG. 4 shows the dependency of the modulation on the pump power of the pump light pulses 10 in a histogram. In general, the pulse power present in the resonator of the optical system should be adjusted accurately, in order calibrate the system to an attractor. The pulse power can be adjusted for example by regulating the energy of the pump light pulses.

In one example, no bifurcation of the intensities of the pump light pulses of a pump power takes place between approx. 1.2 W and approx. 1.5 W. Said range is depicted as a first unmodulated range 46 in FIG. 4. The schematic representation shows that the resulting pulse train does not comprise a modulation, but that the amplitude of all resulting light pulses is equally high. In other words, with a pump power between approx. 1.2 W and approx. 1.5 W, the exemplary optical system is unable to provide a high-frequency modulated light pulse.

In a different range of the pump power, that is, for example in a range of approx. 1.9 W to approx. 2.2 W, a bifurcation of the pulse intensities does occur, which is labeled as first attractor 40 in FIG. 4. Said pump power adjustment essentially results in exactly two different heights of amplitudes of the light pulses decoupled from the resonator. This yields the modulation illustrated schematically in FIG. 4, which corresponds to the modulation of the first pulse train 30a having half the repetition frequency. Said first attractor 40 is particularly stable, as evidenced by its relatively large capacity range between 1.85 W and 2.2 W. The modulation with half the repetition frequency is maintained in the first attractor, even with a mild fluctuation of the pump power.

If the energy is adjusted upward, that is, for example above a pump power of 2.8 W, a second unmodulated range 45 is generated, in which no clearly identifiable modulation occurs in the pulse train.

No attractors are generated in a range between approx. 2.2 W and approx. 2.8 W, but instead relatively unstable and thus irregular modulations in an unstable range labeled with the reference number 44.

A plurality of other attractors of the optical system is present in an attractor range 47 between approx. 1.5 W and approx. 1.85 W. The second attractor 41 of the optical system, which occurs at a pump power of approx. 1.58 W, is clearly labeled. The third pulse train 33c from FIGS. 2a and 2b results from said second attractor. The corresponding pulse train is illustrated schematically in FIG. 2a. The remaining attractors depicted in FIGS. 2a and 2b having the different integral multiples of the repetition rate as modulation frequency can likewise be adjusted in the attractor range 47 with a pump power between approx. 1.5 to 1.85 W.

Modulations with modulation frequencies up to one tenth of the repetition frequency were positively demonstrated in experiments. However, said states become increasingly unstable, wherein the first attractor 40 with half the repetition rate has a particularly stable design.

Furthermore, said first attractor 40 having a modulation frequency of half the repetition frequency of the pump light pulses is particularly advantageous for applications. Said special modulation is also known as "period doubling" or as period-two-modulation, and is very pronounced in the optical system 1.

For the attractors and pump powers shown in FIG. 4, a measurement was conducted involving the modulated light pulses having a wavelength of 1590 nm. This corresponds to the signal pulse of an OPO, which is pumped with pump light pulses at a wavelength of approx. 1040 nm. For the other involved light pulses, that is, the residual pump light pulse as well as the idler pulse, the observed behavior is significantly different, meaning that the attractors for the remaining light pulses can occur at different levels. In so doing, the observed behavior, that is, the type of different attractors and the unmodulated and/or unstable ranges are in each case similar, but can be more or less pronounced.

Figure 3:
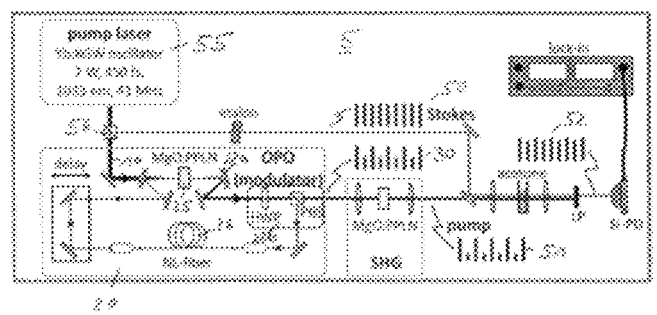
FIG. 3 shows a schematic representation of an exemplary embodiment of an optical system for the provision of modulated high-frequency light pulses implemented in a Raman microscope.

FIG. 3 shows a schematic representation of a Raman microscope 5 for stimulated Raman scattering in an optical system, whose design is similar to the optical system shown in FIG. 1. Thus, FIG. 3 illustrates the optical system according to the invention implemented in the Raman microscope 5. The setup can be used to analyze a sample, such as e.g. acetone. In so doing, an unmodulated Stokes pulse 50 is beamed through a sample together with a correlating modulated pumped pulse 51; in the illustrated example, this is acetone. In so doing, the Stokes pulses 50 and the pumped pulses 51 interact with the sample in a generally known fashion. The Stokes pulses are converted into Interaction pulses 52 by said Raman interaction, which are detected by a photodetector. Said Interaction pulses 52 contain information for the generation of a data point in the Raman spectrum. The principle of a Raman microscope is generally known in the prior art, albeit not with the use of the illustrated optical system for the generation of the Stokes pulses 50 and the pumped pulses 51.

A pulsed laser, such as for example a Yb:KGW oscillator serves as pump light source 55. The pump light source 55 initially provides high-frequency output light pulses, one portion of which is split off on a beam splitter 56 and used as reference light pulses, in this case as Stokes pulses 50. A remaining portion is coupled into the resonator 20 of the optical system as pump light pulses 10, said optical system providing the pumped pulse 51. In the resonator, the NL fiber serves as feedback medium 26 in the feedback arm, and a MgO:PPLN serves as frequency conversion medium 25. The decoupling element has a multi-part design and comprises a first decoupling component 22a, on which the residual pump light pulse and the idler pulse are decoupled, but not the signal pulse. The signal pulse is partly decoupled as modulated light pulse 30 on the second decoupling component 22b of the decoupling element, and partly coupled back into the feedback arm as feedback light pulse.

Thus, the optical system passively provides the modulated light pulse 30, which can be used as pumped pulse 51 of the Raman microscope 5, e.g. after adjusting the wavelength to a SHG (abbreviation of Second Harmonic Generation) crystal.

The other elements of the Raman microscope 5 can be designed as disclosed in the prior art.

The optical system simplifies the setup of the Raman microscope 5 and enables the modulation of light pulses with ultra-high frequencies.

Figure 5:
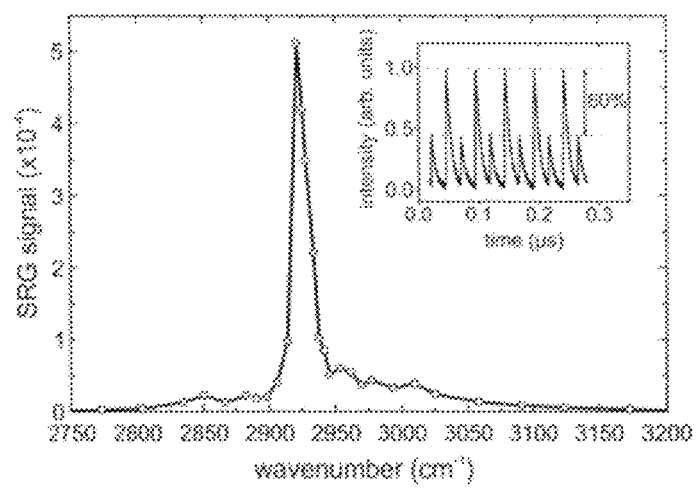
FIG. 5 shows a diagram of a Raman spectrum of acetone.

FIG. 5 shows a diagram of the Raman spectrum of acetone, which was created with a Raman microscope, where the modulated light pulses 30 of the optical system were used as pumped pulses 51. The Raman spectrum was created with Interaction pulses 52, cp. FIG. 3.

The non-linear feedback in the feedback arm 24 is precisely balanced in the optical system. For this purpose, for example a self-phase modulation (in short: SPM), filtering through an amplification bandwidth of the frequency conversion medium, and/or group velocity dispersion (in short: GVD) is adjusted together with a parametric amplification, either individually or in combination. The modulation frequency and the modulation depth in the optical system 1 can be fine-tuned e.g. with a variation of the decoupling coefficient and/or the pump power (as illustrated with the example in FIG. 4). The fine-tuning of said effect can in theory be described with the Ginsburg-Landau equation. The behavior resembles a period doubling and/or period multiplication behavior in fiber lasers.

Thanks to the additional wavelengths (e.g. signal pulse and idler pulse) provided in the resonator 20, the optical system 1 can be used in particular in spectroscopy, where two or more synchronized pulse trains with different wavelengths are required. In so doing, one of the pulse trains can be used in a modulated form, to enable the use of lock-in techniques.

In the optical system 1, the modulated light pulses can be generated with a different wavelength (that is, the two conversion light pulses) and the feedback light pulses can be modulated in a single component, namely the optical resonator 20. As a result, the complexity of the optical system 1 is significantly reduced.

The modulated residual pump light pulse and the two modulated conversion light pulses even make it possible to provide a total of three pulses with three different wavelengths as modulated synchronized light pulses and/or pulse trains.

Moreover, it is even possible to achieve the maximum possible modulation frequency with the modulation, namely half the repetition rate. Half the repetition rate is reached for example in the first attractor shown in FIG. 4 with the reference number 40. Said modulation with half the repetition rate enables the best possible signal-to-noise ratio in lock-in-based measuring techniques.

In one experiment, the Raman spectrum depicted in FIG. 5 was achieved. This demonstrates that the optical system 1 can be used in particular for pumped sample spectroscopy and that excellent efficiencies can be achieved in the process. The Raman spectrum shown in FIG. 5 is based on stimulated Raman scattering and was carried out with a modulation frequency of 20.5 MHz, corresponding to half the repetition rate.

REFERENCE LIST

1 Optical system
5 Raman microscope
10 Pump light pulse
20 Resonator
21 Coupling element
22 Decoupling element
22a First decoupling component
22b Second decoupling component
23 First resonator arm
24 Feedback arm
25 Frequency conversion medium
26 Feedback medium
27a First deflection mirror
27b Second deflection mirror
30 Modulated light pulse
31 Residual pump light pulse
32 Feedback light pulse 33a-33e Modulated pulse trains
34 Continuously modulated pulse train
35 Randomly modulated pulse train
40 First attractor
41 Second attractor
44 Unstable range
45 Second unmodulated range
46 First unmodulated range
47 Attractor range
50 Stokes pulse
51 Pump pulse
52 Interaction pulse
55 Pump light source
56 Beam splitter

The invention claimed is:

1. An optical system for the provision of at least one high-frequency modulated light pulse, comprising:
a pump light source configured to provide of high-frequency pump light pulses;
an optical resonator having a coupling element configured for coupling the high-frequency pump light pulses into the resonator and a decoupling element for decoupling at least one high-frequency modulated light pulse from the resonator and
an optically non-linear frequency conversion medium arranged in the resonator for transforming the pump light pulses in each case into first and second conversion light pulses and one residual pump light pulse;
wherein the resonator comprises a feedback arm for at least one of the first and second conversion light pulses and/or the residual pump light pulse, wherein an optically non-linear feedback medium is arranged for the optical modulation of at least one of the first conversion light pulse, the second conversion light pulse, and the residual pump light pulse.

2. An optical system according to claim 1, wherein a non-linear phase shift of at least one of the first conversion light pulses, the second conversion light pulse, and the residual pump light pulse in the feedback medium is adjusted to an attractor of the optical system.

3. An optical system according to claim 1, wherein the resonator is designed as an optical parametric oscillator, which is pumped synchronously by the pump light pulses and generates the two conversion light pulses as a signal pulse and an idler pulse.

4. An optical system according to claim 3, wherein exactly one of the three following pulses is optically modulated in the feedback arm:
the signal pulse,
the idler pulse, or
the residual pump light pulse;
and wherein the optical modulation of the pulse modulated in the feedback arm brings about a correlating modulation of the other two of the above-mentioned pulses.

5. An optical system according claim 1, wherein the pump light source is configured to provide the high-frequency pump light pulses with a repetition rate of at least 1 MHz.

6. An optical system according to claim 1, wherein the high-frequency modulated light pulse that is decoupled from the resonator includes at least one of the first conversion light pulse, the second conversion light pulse, or the residual pump light pulse.

7. An optical system according to claim 1, wherein the pump light source initially provides high-frequency output light pulses, which are divided by a beam splitter into the high-frequency pump light pulses for coupling into the resonator on the one hand, and into high-frequency reference light pulses on the other hand.

8. An optical system according to claim 7, wherein the system is configured for providing the high-frequency reference light pulses such that they correlate with the high-frequency modulated light pulses.

9. An optical system according to claim 8, wherein the high-frequency reference light pulses and the high-frequency modulated light pulses are designed and envisioned as Stokes pulses and pumped pulses in a Raman microscope.

10. An optical system according to claim 1 having an output adjustment device for adjusting the output of the pump light pulses that are coupled into the resonator.

11. An optical system according to claim 1, wherein a decoupling coefficient of the decoupling element is adjustable.

12. An optical system according to claim 1, wherein the decoupling element is designed and arranged such that the residual pump light pulse and the firstconversion light pulse are completely decoupled, while the second conversion light pulse is at least partly deflected into the feedback arm.

13. An optical system according to claim 1, wherein the feedback arm is designed as a separate feedback arm, which is spatially separated from a resonator arm of the resonator, in which the frequency conversion medium is arranged.

14. An optical system according to claim 1, wherein the provided high-frequency light pulse is modulated exclusively in an optical fashion.

15. An optical system according to claim 1, wherein the optically non-linear feedback medium is configured for the purely passive and purely optical modulation of the at least one conversion light pulse and/or the residual pump light pulse.

16. An optical system according to claim 1, wherein exactly one of the three following pulses is optically modulated in the feedback arm:
the first conversion light pulse, wherein the first conversion light pulse is a signal pulse,
the second conversion light pulse, wherein the second conversion light pulse is an idler pulse, or
the residual pump light pulse;
and wherein the optical modulation of one of the three above-mentioned pulses brings about a correlating modulation of the other two of the above-mentioned pulses.

17. A method according to claim 16, wherein at least one of the first conversion light pulse, the second conversion light pulse, and the residual pump light pulse is modulated in a purely passive and purely optical fashion in the feedback arm of the resonator by means of the optically non-linear feedback medium.

18. A method for the provision of at least one high-frequency modulated light pulse, the method comprising:
providing high-frequency pump light pulses;
coupling the high-frequency pump light pulses into an optical resonator;
transforming the pump light pulses are in each case in an optically non-linear fashion in the resonator into a first conversion light pulse, a second conversion light pulse, and a residual pump light pulse; and
decoupling the at least one high-frequency modulated light pulse from the resonator;
wherein at least one of the first conversion light pulse, the second conversion light pulse, and the residual pump light pulse is optically modulated in a feedback arm of the resonator by means of an optically non-linear feedback medium.

* * * * *